J. B. McCARTNEY.
Rotary Steam-Engines.

No. 149,772. Patented April 14, 1874.

Witnesses.
A. McCallum
D. G. Stuart

Inventor.
James B. McCartney,
by W. B. Richards,
atty.

AM. PHOTO-LITHOGRAPHIC Co. N.Y. (OSBORNE'S PROCESS.)

UNITED STATES PATENT OFFICE.

JAMES B. McCARTNEY, OF YOUNG AMERICA, ILLINOIS, ASSIGNOR OF ONE-HALF HIS RIGHT TO HENRY H. McCARTNEY, OF VILLISCA, IOWA.

IMPROVEMENT IN ROTARY STEAM-ENGINES.

Specification forming part of Letters Patent No. 149,772, dated April 14, 1874; application filed February 13, 1874.

*To all whom it may concern:*

Be it known that I, JAMES B. MCCARTNEY, of Young America, county of Warren and State of Illinois, have invented certain Improvements in Rotary Steam-Engines, of which the following is a specification:

The nature of my invention relates to improvements in rotary steam-engines; and the invention consists in the arrangement within a hollow cylinder of a cam-shaped shaft and a series of peculiarly-constructed hinged valves, the steam entering through the shaft and ducts or passages in the heads of the cylinder to the seats of the valves, and escaping by a similar route, the arrangement being such that by changing ends of the shaft to which the steam is admitted, the engine may be reversed. Devices are also added for the purpose of distributing the strain when heavier work is required, all as hereinafter fully described.

Figure 7:
Figure 6:
Figure 4:
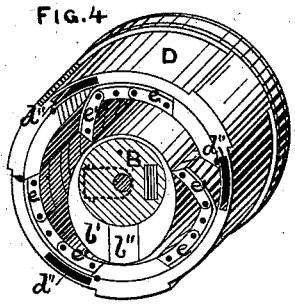
Figure 5:
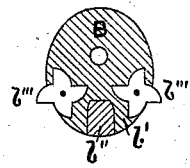
Figure 3:
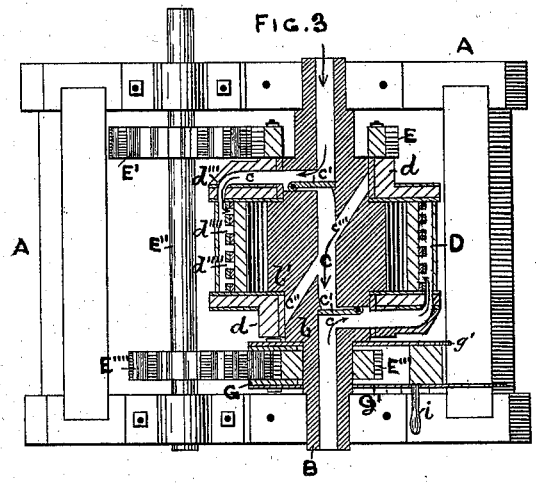
Figure 2:
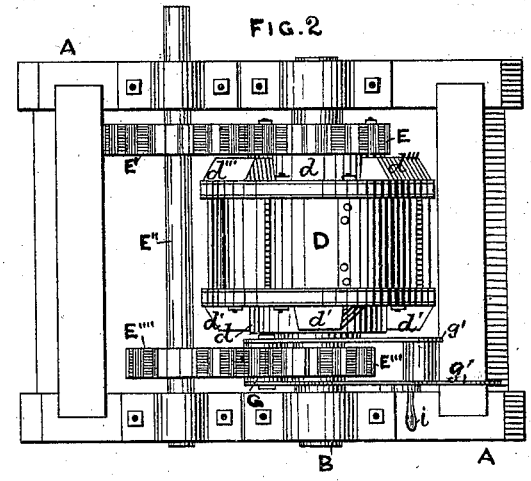
Figure 1:
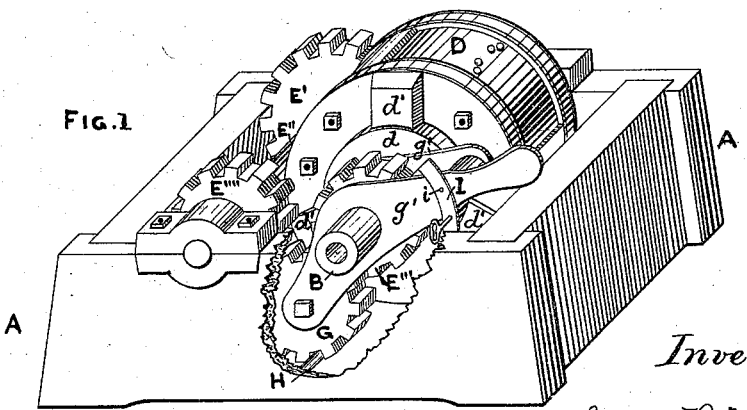

In the accompanying drawing, Figure 1 is a perspective view of a machine embodying my invention. Fig. 2 is a top-plan view. Fig. 3 is a horizontal sectional view of the cylinder and interior. Fig. 4 is a perspective view of the steam-cylinder, with one head removed. Fig. 5 is a transverse sectional view of the shaft. Fig. 6 is a perspective view of one of the valves.

Referring to the parts by letters, letters A represent the supporting-frame. B is a shaft journaled in the side frames A A. The shaft B is enlarged at $b$, and again at $b'$, the enlargement $b'$ being a cam-shaped extension of one side, and has a rubber or other suitable packing, $b''$, in its outer edge. C is a central opening through the shaft B, and $c\ c$ are openings outward from the opening C, at the enlargements $b$. $c'\ c'$ are outwardly-opening valves in the opening C, at the points shown. D is the cylinder, with an enlarged central part, D, and smaller ends $d\ d$. Its central part is provided with a series of hinged arc-shaped valves, $e$, opening in one direction, and a similar series, $e'$, opening in an opposite direction. These valves $e\ e'$ are constructed in sections, as plainly shown at Fig. 6, their lines of union in a diagonal direction, so that contraction or extension by heat or cold may not affect the length of the valve. The sections are held in place by pins $e''$, which pass loosely through holes through them, the holes through which the pins pass being elongated to allow this operation to take place. $d'\ d'\ d'$ are radial extensions, with openings or ducts through them, which lead from corresponding radial ducts in the contracted parts $d$ of the cylinder D to ducts $d''\ d''\ d''\ d''$ in the casing of the cylinders D, which ducts lead inward to openings $d''''$ behind the valves $e$. The opposite ends of the cylinders D have extensions $d'''\ d'''\ d'''$ with ducts, and discharge behind the valves $e'$ on the same principle. $b'''\ b'''$ are small star-wheels, seated and journaled in recesses in the shaft B, with their points projecting, as shown at Fig. 5. $c''\ c'''$ are diagonal openings or passages in the shaft B, situated as shown at Fig. 3. E is a gear-wheel, attached to and rotating with the cylinder D, and gears with another similar wheel, E', on a shaft, E''. E''' is a gear-wheel on the opposite end of the shaft B from the wheel E. G is a gear-wheel, carried on the ends of shipping-levers $g'$, in such manner that it may be thrown up to gear with the wheels E''', and a wheel, E'''', on the shaft E''. H is a pin, which engages with the wheel G, when it is thrown out of gear, as shown at Fig. 1. I is a rack-bar, to which the lever $g'$ may be secured by a pin, $i$, to hold the wheel G in or out of gear.

The operation of my invention is as follows: Steam is admitted at either end of the shaft B, and it may be observed here that the admission of it at opposite ends thereof rotates the engine in opposite directions, so that one direction is deemed sufficient for explanation. We will suppose, in starting, that the wheel G is thrown down, and then locked by the pin H, which will hold the wheel E''' and the shaft B from rotating. Steam now entering the distant end of the shaft B, as shown by the arrows at Fig. 3, will, when the ducts hereinbefore described coincide with each other, pass into the rear of the set of valves $e'\ e'\ e'$, and throwing them out, as shown at Fig. 4, will rotate the cylinder D on the shaft B, in the obvious manner. When the cylinder has rotated sufficiently to bring the valves $e'$ alternately into positions where the steam would have a backward pressure, the admission is cut off by the induction-openings not coinciding, and the passages $c$, being then in contact with the passages $c'''$, will allow the steam to escape through the diagonal openings $c'''$, and outward through the valve $c'$ and that end of the shaft B. When it is desired to run with a light power, the gear-wheels E and E' are alone engaged to transmit motion to the shaft E''; but when heavier work is required, the shipping-levers I may be utilized to raise and release the wheel G from the locking-pin H, and throw it into gear with the wheels E''' E'''', and thus set the shaft B free to rotate in an opposite direction from the cylinder D, and give it also, together with the cylinder D, two connections with the shaft B, and thereby reduce the strain inseparable from the increased work required of the engine. The star-wheels $b'''$ will assist in pressing the valves $e\ e'$ into their seats, when they pass over those which are exhausting steam. The packing $b''$ will aid in preserving steam-tight connections, &c. The valves $e$ and $e'$ are hinged upon one of the rods $e''$ which pass through them.

Having now described my invention, what I claim as new, and desire to secure by Letters Patent, is—

1. The valves $e\ e'$, arranged to operate with the cylinder D, shafts B $b$, ducts C $c''\ c'''$, and star-wheels $b'''$, substantially as and for the purpose specified.

2. The valves $e\ e'$, constructed in sections, substantially as described, and for the purpose specified.

3. The levers $g'$ and wheel G, arranged to operate with wheels E''' E'''' and E' E, and cylinder D and shaft B, substantially as described, and for the purpose specified.

JAMES B. McCARTNEY.

Witnesses:
  M. H. BARRINGER,
  P. R. RICHARDS.